United States Patent
Wong et al.

(10) Patent No.: US 12,313,479 B1
(45) Date of Patent: May 27, 2025

(54) SEMICONDUCTOR STRAIN GAGE

(71) Applicant: Piezo-Metrics Inc, Simi Valley, CA (US)

(72) Inventors: Franklin Curtis Wong, Simi Valley, CA (US); Robert Andrew Mueller, Simi Valley, CA (US); Kimberly Lakea Harrison, Martinez, CA (US); Farzad Khademolhosseini, Burlingame, CA (US); Carolyn D. Bianco, San Francisco, CA (US)

(73) Assignee: Piezo-Metrics Inc, Simi Valley, CA (US)

( * ) Notice: Subject to any disclaimer, the term of this patent is extended or adjusted under 35 U.S.C. 154(b) by 0 days.

(21) Appl. No.: 18/408,964

(22) Filed: Jan. 10, 2024

Related U.S. Application Data (62) Division of application No. 17/700,266, filed on Mar. 21, 2022, now Pat. No. 11,906,375.

(60) Provisional application No. 63/164,923, filed on Mar. 23, 2021.

(51) Int. Cl.
*G01L 1/22* (2006.01)
*G01L 1/20* (2006.01)

(52) U.S. Cl.
CPC ............ *G01L 1/2293* (2013.01); *G01L 1/205* (2013.01)

(58) Field of Classification Search
CPC ............................. G01L 1/205; G01L 1/2293
See application file for complete search history.

(56) References Cited

U.S. PATENT DOCUMENTS

| | | | |
|---|---|---|---|
| 3,798,754 A | 3/1974 | Price et al. | |
| 3,849,874 A * | 11/1974 | Jeffers .................. | G01L 1/2293 29/25.35 |
| 6,444,487 B1 * | 9/2002 | Boggs .................. | G01L 9/0055 438/459 |
| 11,906,375 B1 * | 2/2024 | Wong ..................... | G01L 1/205 |
| 2007/0254387 A1 | 11/2007 | Hakomori et al. | |
| 2021/0257539 A1 | 8/2021 | Nihat | |

OTHER PUBLICATIONS

Final Rejection Mailed on Nov. 21, 2023 for U.S. Appl. No. 17/700,266, 5 page(s).
Non-Final Rejection Mailed on Sep. 7, 2023 for U.S. Appl. No. 17/700,266, 8 page(s).
Notice of Allowance and Fees Due (PTOL-85) Mailed on Dec. 28, 2023 for U.S. Appl. No. 17/700,266, 7 page(s).
Requirement for Restriction/Election mailed on Mar. 7, 2023 for U.S. Appl. No. 17/700,266.

* cited by examiner

*Primary Examiner* — Minh N Trinh
(74) *Attorney, Agent, or Firm* — Kaplan Breyer Schwarz, LLP (57) ABSTRACT

Strain gages in accordance with the present disclosure are sculpted from a device layer of a semiconductor-on-insulator wafer using deep reactive ion etching, yielding very good control over the electrical properties and physical dimensions of the strain gages. In some embodiments, groups of fully fabricated strain gages are physically connected to handling frames via sprues, which eases handling, enables automated assembly, and facilitates tracing of individual gages from the beginning of fabrication through final packaging. In some embodiments, sprues are configured to mitigate accidental separation of the gages from their frames while simultaneously easing their removal in response to specific forces applied by a handling tool.

20 Claims, 9 Drawing Sheets

FIG. 4G sectional views through line a-a

SEMICONDUCTOR STRAIN GAGE

CROSS REFERENCE TO RELATED APPLICATIONS

This application is a divisional application of U.S. patent application Ser. No. 17/700,266 filed Mar. 21, 2022, which claims the benefit of U.S. Provisional Patent Application Ser. No. 63/164,923 filed Mar. 23, 2021, each of which is incorporated by reference as if set forth at length herein.

TECHNICAL FIELD

The present disclosure is directed to semiconductor processing in general and, more specifically, to high-volume fabrication of semiconductor strain gages having well-controlled performance specifications.

BACKGROUND

Semiconductor strain gages have been produced on a commercial scale since the 1960's using methods based on the state-of-the-art techniques developed for the early integrated circuits at that time. Unfortunately, while the integrated-circuit (IC) manufacturing sector has moved to higher volume, smaller features, larger wafer diameters and foundry-type processes, commercial production of semiconductor strain gages remains substantially unevolved from the same early manufacturing approaches, which are suitable mainly for only low-volume production of devices having relatively large features. In addition, conventional strain gage production typically employs small wafer diameters and labor-intensive processes, which severely limits migration to high volume and gives rise to poor control of device performance.

Conventional strain-gage manufacturing is a highly manual process and uses wet chemistry and plasma methods to etch the gage planform part way into a silicon wafer. Terminal pads are then formed on the partially defined gage bodies and the wafer is diced into strain-gage strips (hereinafter referred to as "gage strips"). The gage bodies in each gage strip are physically connected by the unetched portion of the silicon wafer. Gage leads are added to the terminal pads via wire-bonding and the wire-bonded gage strips are then held, upside down, in wax bobs to expose their back surfaces while protecting the terminal pads and wire bonds. A timed acid etch is used to remove the excess silicon material holding the individual gages together, after which, the individual gages are separated from the wax.

The gage resistance of each gage is measured. Those strain gages whose gage resistance falls outside an acceptable range for ambient temperature gage resistance are adjusted individually in a manual, acidic trim-etch operation. Upon completion of the gage-resistance-trimming procedure, the gages are further characterized by measuring their gage resistances at a low, medium and high temperature in a conditioning chamber.

Unfortunately, the highly manual nature of the manufacturing process gives rise to wide variation of gage temperature-resistance. Because accurate, high-output sensors require a group of two or four semiconductor strain gages having closely matched temperature-resistance characteristics, the wide variation of this parameter makes it necessary either manually or numerically examine every gage to identify groups of gages having matched performance. Matching gages must then be physically located and grouped together before being delivered for sensor manufacture. The manual nature of conventional strain gage manufacture, therefore, results in excess cost and diminished sensor performance.

The need for semiconductor strain-gages that have tightly controlled performance characteristics and that are amenable to high-volume, low-cost production remains, as yet, unmet in the prior art.

SUMMARY

The teachings of the present disclosure are directed to enabling strain gages having tightly controlled performance characteristics using high-volume, highly reproducible processing techniques developed for large-scale production of modern integrated circuits.

An advance over the prior art is realized by sculpting the main structural members of semiconductor strain gages from the device layer of a semiconductor-on-insulator substrate. Since semiconductor-on-insulator substrates are widely used in modern IC fabrication, the thickness and resistivity of their device layers are well controlled. In addition, such substrates are readily available in large diameters suitable for volume production. As a result, the gage resistance of a semiconductor strain gage body that is lithographically defined and sculpted from the device layer of a semiconductor-on-insulator substrate can be held within a significantly narrower gage-resistance range than possible in the prior art.

An illustrative embodiment in accordance with the present disclosure is a strain gage whose body is etched from the device layer of a semiconductor-on-insulator substrate using deep reactive ion etching. The strain gage includes wirebond pads formed on highly doped contact regions at opposite ends of the gage, which is subsequently released as a free-standing element.

A representative method for fabricating a strain gage in accordance with the present disclosure begins with providing a semiconductor-on-insulator substrate having a device layer disposed on a buried oxide layer that is disposed on a handle substrate, where the device layer has a desired thickness, $t1$, and desired resistivity, $\rho1$. At each location within an array of strain gage sites distributed over the device layer, a pair of electrical contacts is formed by defining metal contact pads disposed on highly doped regions of the device layer. The device layer is then etched via deep reactive ion etching to sculpt a strain gage body at each location such that each strain gage body includes a different pair of the electrical contacts. Wire bonds are then made to each electrical contact to fully form the array of strain gages. The buried oxide layer is then removed from under each strain gage, thereby releasing the entire strain-gage array from the handle substrate.

In some embodiments, neighboring strain gages are physically connected to one another via narrow tabs of active-layer material (i.e., "sprues") defined at the same time as the strain-gage bodies. In some of these embodiments, strain gages of each row or column of the strain-gage array are interconnected via sprues.

In some embodiments, the sprues include stress-concentrating features for facilitating their breakage during packaging by, for example, force applied by a pick-and-place tool. In some such embodiments, the stress-concentrating features enable the sprues to be broken by an applied force that is too low to cause damage to a strain gage or its wire bonds. In some such embodiments, the stress-concentrating features are designed to break in response to a particular type of lifting force applied to a strain gage by a lifting tool, such as a pick-and-place end effector, tweezers, a pincher, a controlled-release tool, and the like.

In some embodiments, the individual strain gages of the strain gage array are tested at the wafer level, prior to their removal from the handle substrate, to determine a map of a parameter, such as gage resistance, temperature-resistance characteristics, and the like. In some embodiments, a map of a parameter (e.g., sheet resistance, thickness, etc.) of the device layer is developed prior to fabricating an array of strain gages from it. A strain-gage array is then fabricated from the device layer using a mask set selected from a plurality of mask sets, each having slightly different feature geometries. The mask set used for fabrication is selected to yield the greatest number of gages having a gage resistance within a desired range based on the map.

An embodiment in accordance with the present disclosure is an apparatus comprising at least one strain gage, each strain gage having: a body having a first width, a first thickness, and a first length, the body being characterized by a longitudinal axis along a first direction, wherein the body comprises a first portion of a device layer of a semiconductor-on-insulator substrate, and wherein the device layer has the first thickness and comprises a first semiconductor having a first resistivity; and first and second contacts, each of the first and second contacts including a doped region of the device layer and a bond pad disposed on and electrically connected with the doped region, wherein the doped region comprises the first semiconductor and a first dopant and has a second resistivity that is lower than the first resistivity, and wherein the first and second contacts are separated by a first distance along the longitudinal axis; wherein the gage resistance of the at least one strain gage is based on the first resistivity, the first thickness, the first width, and the first distance.

Another embodiment in accordance with the present disclosure is a method comprising forming a first strain gage, wherein the first strain gage is formed via operations that include: forming a first contact pair, each contact of the first contact pair being electrically connected with a device layer of a semiconductor-on-insulator substrate comprising the device layer, a handle substrate, and a buried-oxide layer located between the device layer and the handle substrate, wherein the device layer has a first thickness and comprises a first material having a first resistivity; etching the device layer to define a first body that includes the first contact pair; and releasing the first body from the handle substrate by removing the buried-oxide layer.

DETAILED DESCRIPTION

Figure 1:
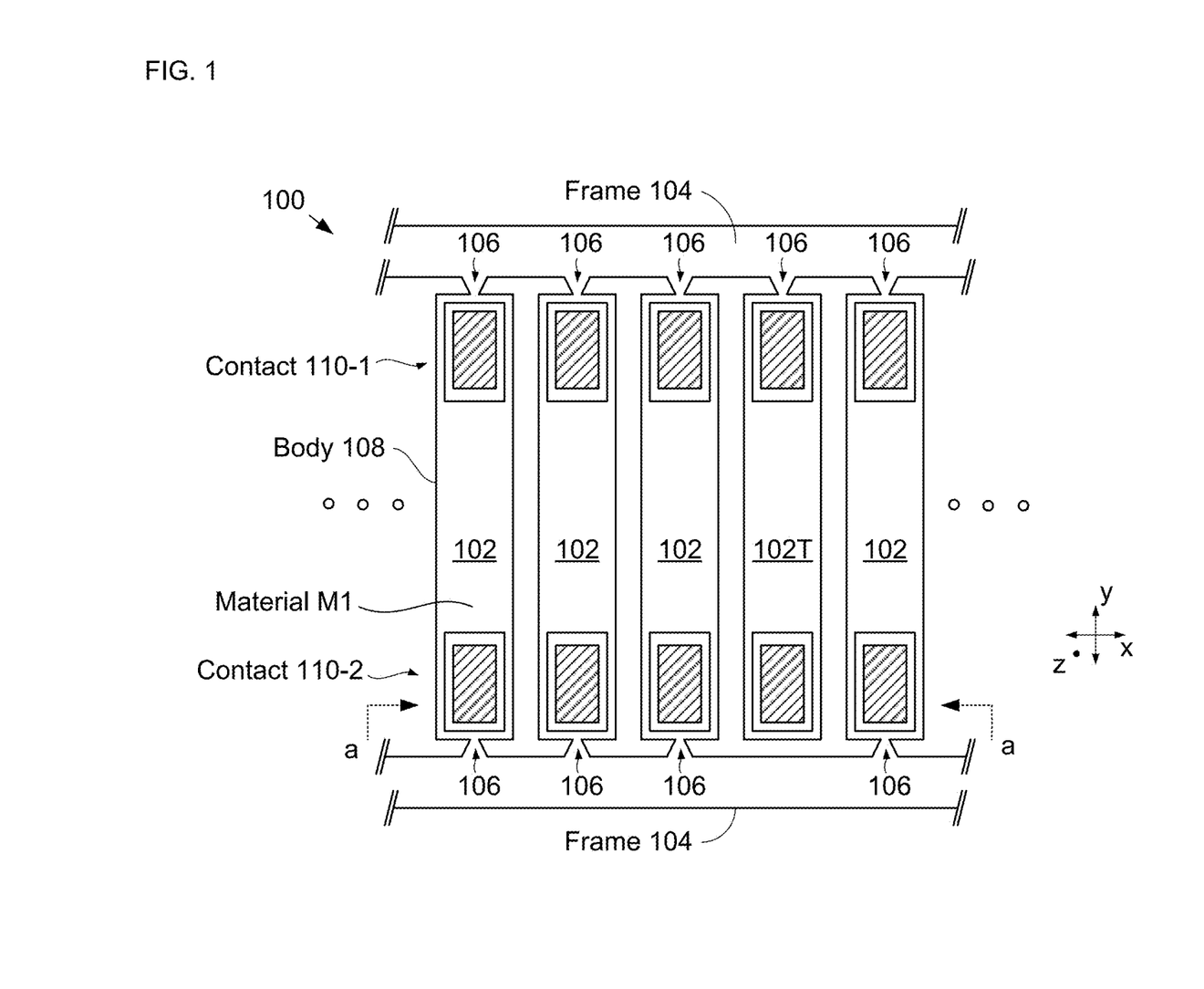
FIG. 1 depicts a schematic drawing of a plan view of a portion of a gage strip in accordance with the present disclosure.

FIG. 1 depicts a schematic drawing of a plan view of a portion of a gage strip in accordance with the present disclosure. Gage strip 100 includes a plurality of substantially identical strain gages 102 and a plurality of test gages 102T, which are formed on a common substrate. In the depicted example, each of strain gages 102 is physically connected to frame 104 via a pair of sprues 106, while each of test gages 102T is physically connected to frame 104 via a single sprue 106. As discussed below, test gages 102T are substantially identical copies of gages 102 formed at specified test locations on the substrate.

Each of gages 102 and test gages 102T is a substantially identical semiconductor strain gage comprising body 108, which comprises material M1, and contacts 110-1 and 110-2. In some embodiments, the strain gages in gage strip 100 are not identical. Strain gage 102 is described in more detail below and with respect to FIGS. 2A-B.

Frame 104 is a rectangular annulus of material M1 that surrounds the plurality of strain gages 102.

Sprues 106 are thin tabs of material M1 that physically connect the ends of each body 108 to frame 104. As discussed below, it is an aspect of the present disclosure that sprues can be designed to facilitate removal of strain gages from their frame with little or no physical damage to the strain gages.

Typically, frame 104, sprues 106, and bodies 108 are sculpted from the same layer (i.e., a layer of material M1) at the same time.

The inclusion of frame 104 and sprues 106 facilitates: 1) controlled wafer-level processing of gages, 2) fast collection of gages from the wafer due to their highly ordered position on the substrate, and 3) tracking of gages and their performance characteristics for binning and quality control.

Figure 2A:
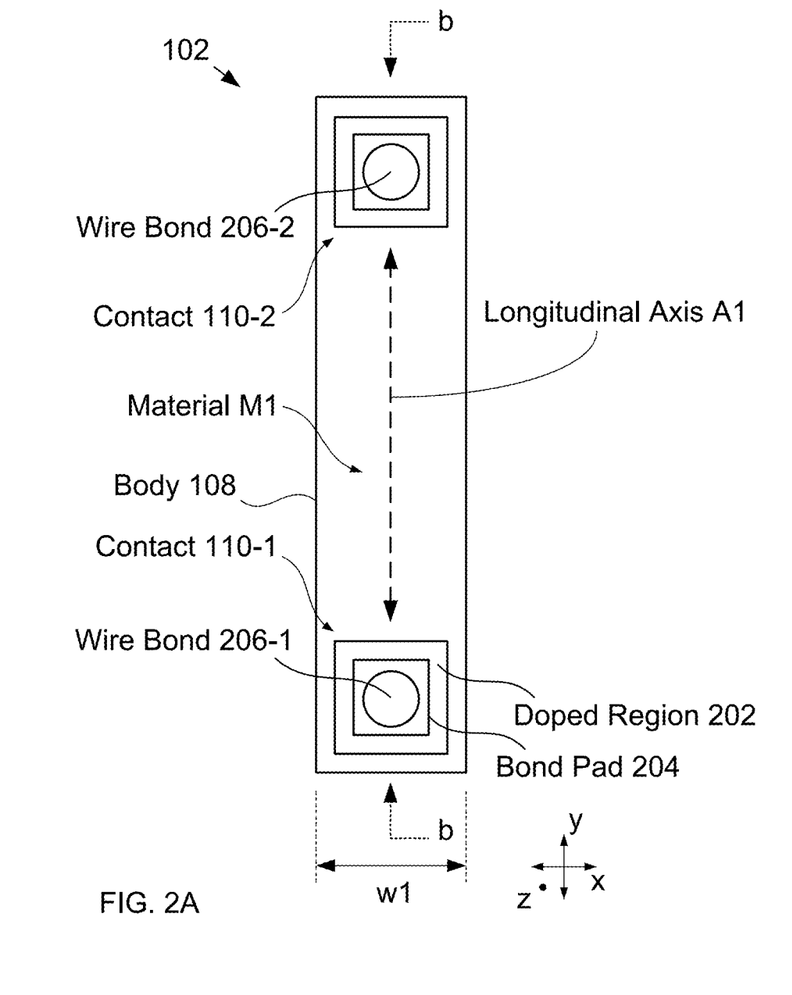
FIGS. 2A-B depict schematic drawings of plan and cross-sectional views, respectively, of an individual strain gage in accordance with the present disclosure.
Figure 2B:
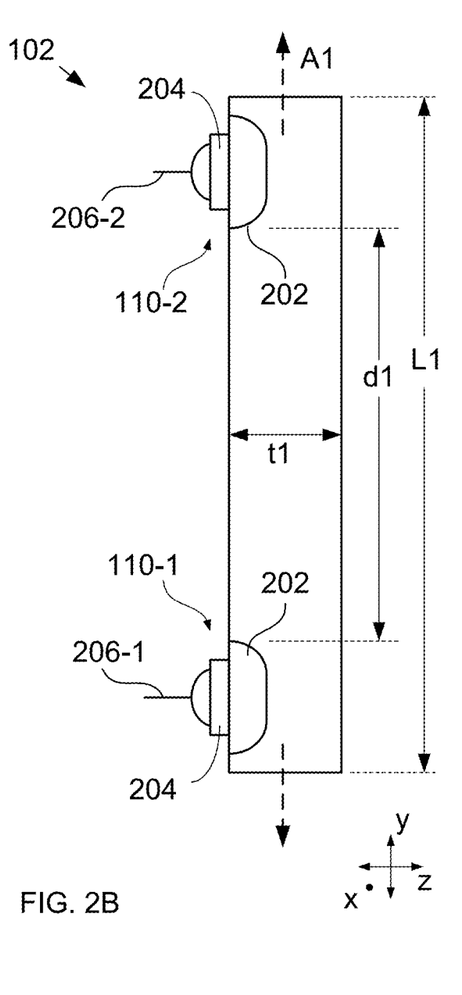

FIGS. 2A-B depict schematic drawings of plan and cross-sectional views, respectively, of an individual strain gage in accordance with the present disclosure. Strain gage 102 (also referred to as "gage 102") includes body 108 and contacts 110-1 and 110-2, which are formed on body 108 such that they are separated by distance d1. As noted above, each of test gages 102T is substantially identical to strain gage 102.

Body 108 is a bar of semiconductor material M1 having length L1, width w1, and thickness t1. Body 108 is characterized by longitudinal axis A1. As would be apparent to one skilled in the art, the gage resistance of gage 102 is based on the dimensions of body 108 (i.e., its length, width, and thickness), the distance, d1, between contacts 110-1 and 110-2, and the resistivity, $\rho 1$, of material M1. Although body 108 is rectangularly shaped in the depicted example, any practical shape can be used for body 108 without departing from the scope of the present disclosure. For example, in some embodiments, body 108 can be U-shaped, M-shaped, O-shaped, irregularly shaped, include one or more dog-bone shaped portions (i.e., portions having wider or narrower ends that taper to a central-body width), etc.

Each of contacts 110-1 and 110-2 (referred to, collectively, as contacts 110) is a conventional electrical contact configured to make ohmic contact with the material of body 108. Each of contacts 110-1 and 110-2 comprise doped region 202 and bond pad 204. Doped region 202 is a heavily doped region formed at the top surface of body 108, while bond pad 204 is a conventional metal contact pad formed on top of doped region 202.

Wire bonds 206-1 and 206-2 (referred to, collectively, as wire bonds 206) are conventional wire bonds formed to provide electrical contact with contacts 110-1 and 110-2, respectively. In some embodiments, gage 102 includes a different electrical connection to contacts 110, such as a tab bond, solder-bump bond, and the like. In some embodiments, gage 102 is configured to enable flip-chip bonding to another element, such as a chip carrier or multi-chip module.

Figure 3:
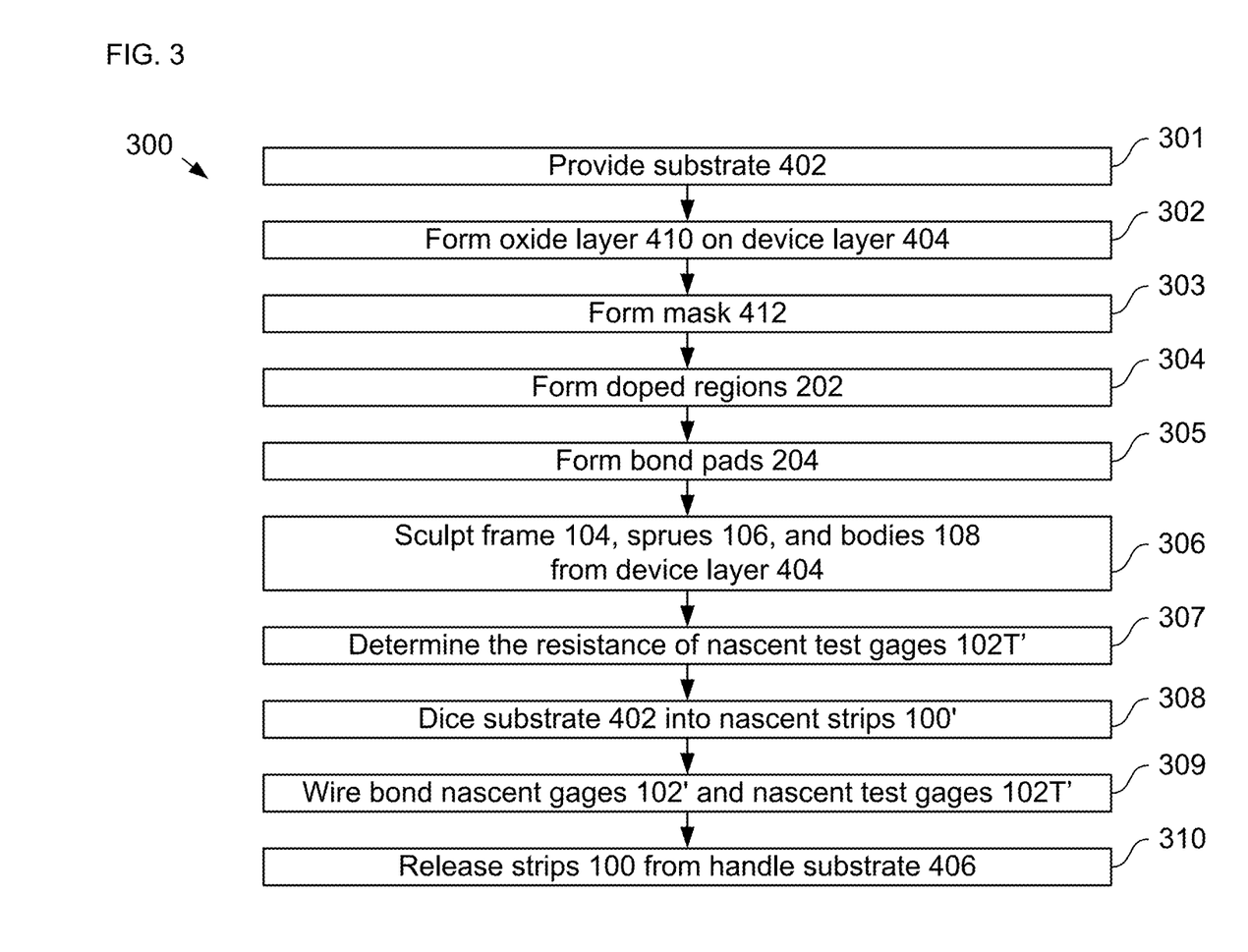
FIG. 3 depicts operations of a method suitable for fabricating a two-dimensional array of gage strips 100 in accordance with the present disclosure.

FIG. 3 depicts operations of a method suitable for fabricating a two-dimensional array of gage strips 100 in accordance with the present disclosure. Method 300 is described herein with continuing reference to FIGS. 1 and 2A-B, as well as and reference to FIGS. 4A-B and 5. Although method 300 is described in the context of fabricating a plurality of gage strips, it will be apparent to one skilled in the art, after reading this Specification, that method 300 can be used to fabricate a one-dimensional array of gage strips, a single gage strip, individual strain gages (i.e., strain gages not formed as part of a gage strip), or any combination of gage strips and strain gages.

Figure 4A:
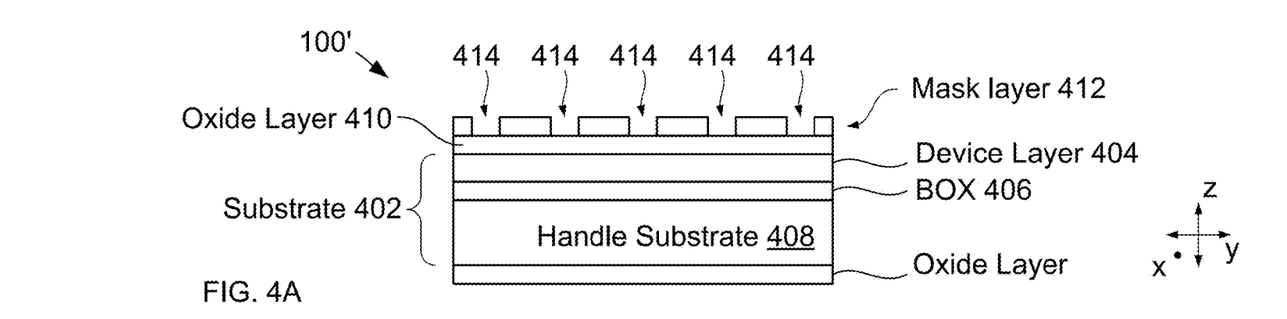
FIGS. 4A-G depict schematic drawings of a sectional view of a portion of a representative gage strip 100 at different stages of its fabrication.
Figure 4B:
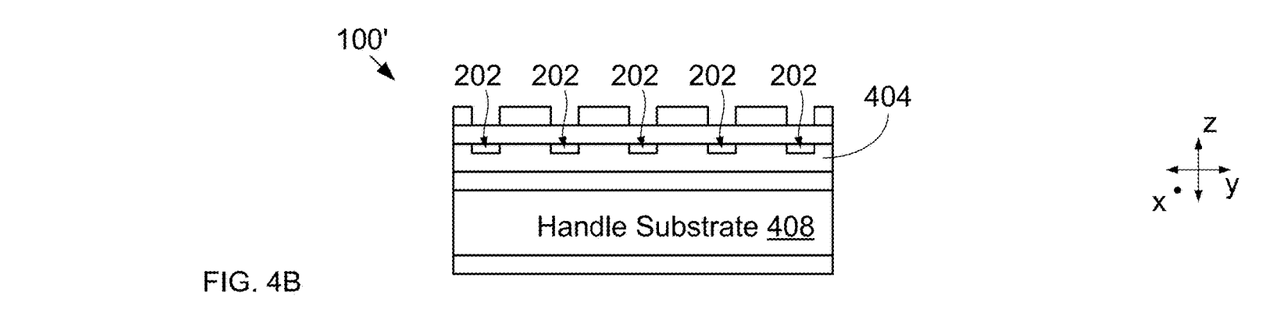

FIGS. 4A-G depict schematic drawings of a sectional view of a portion of a representative gage strip 100 at different stages of its fabrication. The sectional views shown in FIGS. 4A-B are taken through line a-a of FIG. 1.

Method 300 begins with operation 301, wherein substrate 402 is provided. Substrate 402 is a semiconductor-on-insulator (SOI) suitable for use high-volume integrated-circuit manufacture. Substrate 402 includes device layer 404, which is disposed on buried-oxide (BOX) layer 406, which is disposed on handle substrate 408.

Device layer 404 is a layer of material M1 having thickness, t1. In the depicted example, material M1 is single-crystal silicon; however, material M1 can include any suitable doped or undoped semiconductor (e.g., germanium, polysilicon, III-V compound semiconductors, II-VI compound semiconductors, etc.) without departing from the scope of the present disclosure. Furthermore, device layer 404 can have any suitable thickness and resistivity without departing from the scope of the present disclosure.

It is an aspect of the present disclosure that defining the body of a strain gage by sculpting it from the entire thickness of the device layer of an SOI substrate affords embodiments in accordance with the present disclosure with significant advantages over the prior art. First, because many current state-of-the-art CMOS IC fabrication technologies (e.g., fabrication of partially-depleted and fully depleted CMOS electronics, etc.) relies on device layers having extremely well-controlled thickness and resistivity, SOI substrates can be readily obtained with thickness tolerances and total-thickness variation of only a few angstroms. In addition, the doping level of such device levels is also very well controlled; therefore, the resistivity of such device layers is also extremely well controlled. Therefore, strain-gage bodies sculpted from a modern device layer will have extremely stable dimensional and electrical characteristics.

BOX layer 406 is a conventional buried-oxide layer having a thickness sufficient to enable release of fully formed strain gages upon their completion.

Handle substrate 408 is a conventional silicon wafer having a diameter of 150 millimeters (i.e., approximately 6 inches). It should be noted, however, that the diameter of handle substrate 408 can have any practical value.

At operation 302, substrate 402 is oxidized to form oxide layers 410 on the top surface of device layer 404. Typically, an oxide layer is also formed on the bottom surface of handle substrate 408 during operation 302.

At operation 303, mask layer 412 is defined on oxide layer 410 via conventional lithography (e.g., photolithography, x-ray lithography, soft lithography, etc.) to define openings 414 over doped regions 202 at each location within the array of strain gage sites.

FIG. 4A depicts the portion of nascent gage strip 100' after formation of mask layer 412.

At operation 304, doped regions 202 are formed in device layer 404 by implanting dopant through openings 414.

FIG. 4B depicts the portion of nascent gage strip 100' after formation of doped regions 202.

In some embodiments, doped regions 202 are formed by implanting dopant into device layer 404 through a shadow mask that includes openings 414. In some embodiments, doped regions 202 are formed by doping selective regions of device layer 404 via a different suitable doping method (e.g., diffusion, etc.).

Once doped regions 202 are formed, mask layer 412 and oxide layer 410 (as well as any oxide on the backside of handle substrate 408) are stripped from nascent gage strip 100'.

Figure 4C:
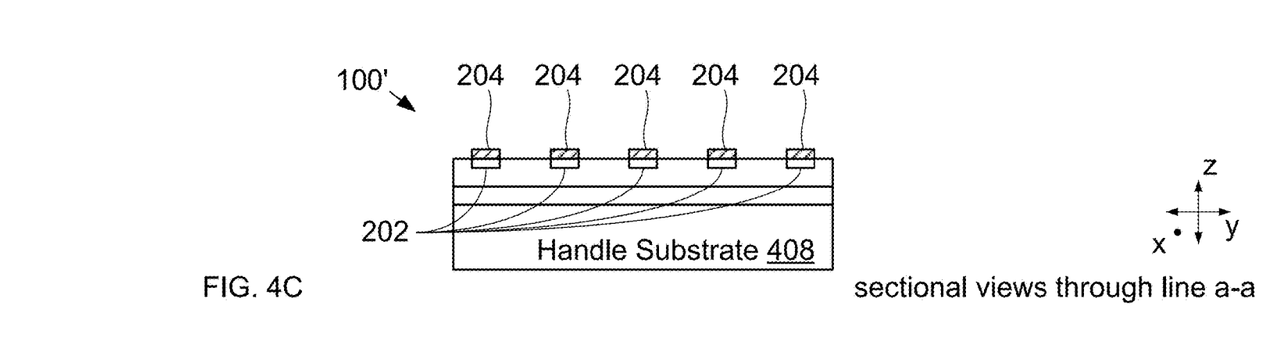

At operation 305, bond pads 204 are formed on doped regions 202 to complete contacts 110. In the depicted example, bond pads 204 are formed by evaporating layers of titanium/tungsten and gold through a shadow mask. In some embodiments, bond pads 204 are formed via a different conventional process and/or have a different metal composition.

FIG. 4C depicts the portion of nascent gage strip 100' after formation of bond pads 204.

Figures 4D, 4E, 4F, 4G:
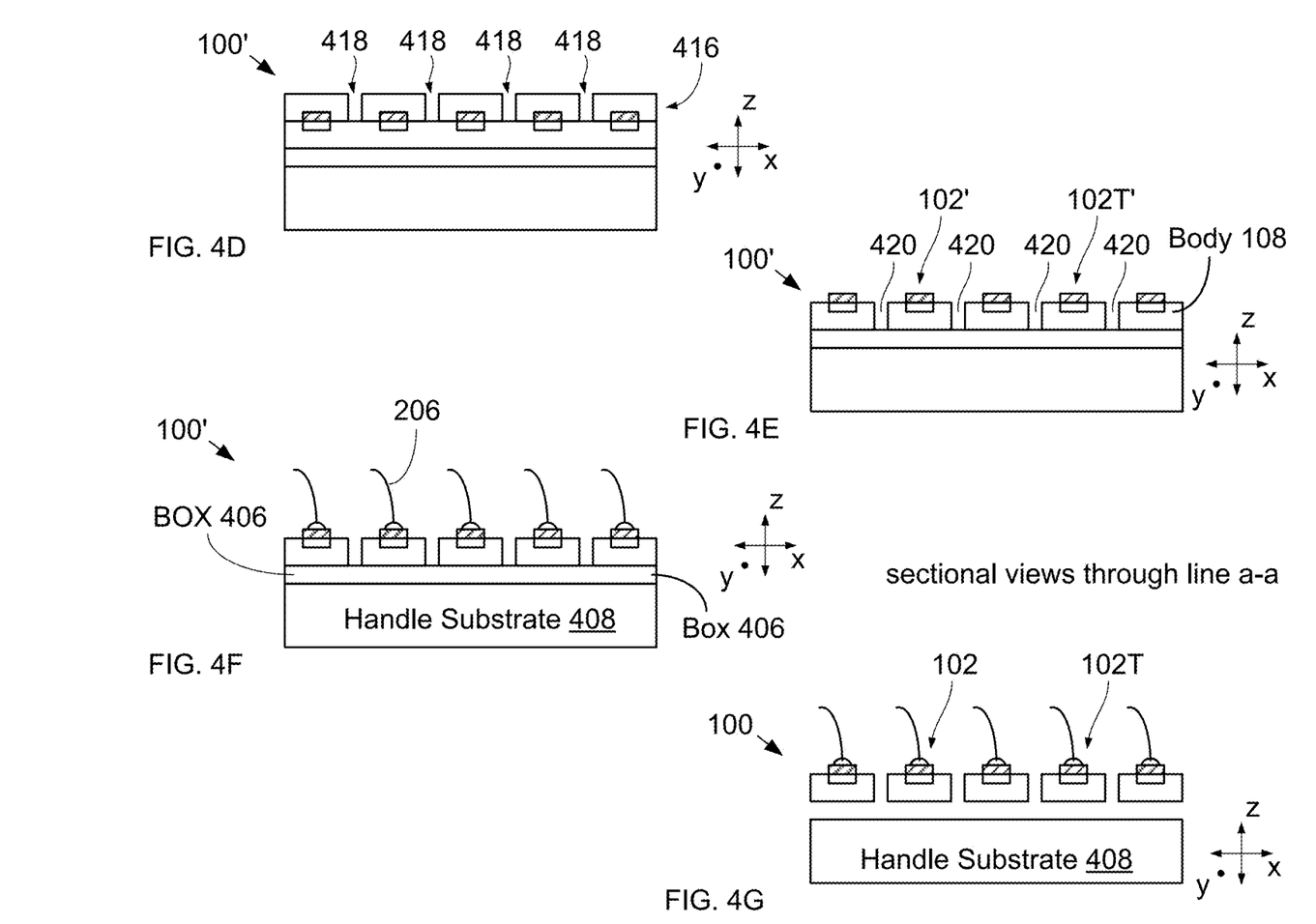

At operation 306, the shapes of frame 104, sprues 106, and bodies 108, are sculpted from device layer 404 by etching through the thickness of through openings 418 to form etched regions 420.

In the depicted example, the formation of etched regions 420 begins with the definition of mask layer 416 on the top surface of substrate 402. Mask layer 416 includes openings 418, which define the planforms of frame 104, sprues 106, and bodies 108 of nascent gage strip 100'.

FIG. 4D depicts the portion of nascent gage strip 100' after formation of mask layer 416.

Once mask layer 416 has been defined, the pattern of openings 418 is transferred into device layer 404 via deep reactive ion etching (DRIE), thereby forming etched regions 420. Etched regions 420 collectively define the shapes of frame 104, sprues 106, and bodies 108. After frame 104, sprues 106, and bodies 108 have been defined, mask layer 416 is stripped from nascent gage strip 100'.

FIG. 4E depicts the portion of nascent gage strip 100' after formation of mask layer 416.

It should be noted that because DRIE has very tight planform dimensional tolerances, it enables the lateral dimensions of body 108 to be precisely defined, thereby affording embodiments in accordance with the present disclosure advantages over the prior art. Specifically, semiconductor strain gages in accordance with the present disclosure can have significantly better gage-resistance uniformity than is possible in the prior art. In addition, since method 300 includes no manual operations, strain gages 102 can more easily be produced in high volume. However, although the depicted example employs DRIE to pattern device layer 404, any suitable etching technique can be used to sculpt bodies 108, sprues 106, and frame 104 from device layer 404 without departing from the scope of the present disclosure.

At operation 307, the gage resistance of each of a plurality of nascent test gages 102T' is determined using conventional wafer-probe techniques. Nascent test gages 102T' are a subset of the plurality of nascent gages 102', where each nascent test gage resides at a different test location on substrate 402, as discussed below and with respect to FIGS. 7A-B. In some such embodiments, the gage resistance of each of every gage in the plurality of gages is measured at operation 307. In some embodiments, resistance values for unmeasured gages are estimated by interpolating between the gage-resistance values of measured devices.

At operation 308, substrate 402 is diced into nascent gage strips 100', each typically containing a plurality of nascent gages 102' and a plurality of nascent test gages 102T'.

At operation 309, wire bonds 206 are joined to contacts 110.

FIG. 4F depicts the portion of nascent gage strip 100' after wire bonds 206 have been added.

It should be noted that nascent gages 102' are fully supported by BOX layer 406 during operation 309, thereby enabling it to better withstand the wire-bonding process without damage to the silicon gage or its silicon tabs.

At operation 310, the wire-bonded and completed gages 102 and test gages 102T, frame 104, and sprues 106 are released from handle substrate 408 by removing BOX layer 406 via a sacrificial etch, thereby completing the fabrication of gage strip 100. In the depicted example, BOX layer 406 is removed via exposure to hydrofluoric (HF) vapor; however, many alternative release-etch methods are known and can be used in operation 310 without departing from the scope of the present disclosure.

FIG. 4G depicts the portion of gage strip 100 after its release from handle substrate 408.

In the depicted example, each body 108 in a gage strip is physically connected to frame 104 by at least one structural "tab" (i.e., a sprue 106). As a result, when the fully formed gages 102 are released from handle substrate 402 in operation 310, the gages in each gage strip are suspended by these sprues and the entire column can be handled as a single object.

It should be noted that, during fabrication and subsequent shipping and handling, strain gages and/or gage strips can be subjected to a significant amount of force and/or stress due to shock, vibration, and the like, which is referred to herein as "passive force." The term "passive force" explicitly excludes force proactively applied to a strain gage or gage strip to separate it from other strain gages or gage strips.

It is another aspect of the present disclosure that a gage strip is characterized by a "passive-force threshold." For the purposes of this Specification, including the appended claims, "passive-force threshold" is defined as the maximum force to which a strain gage or gage strip is unintentionally subjected.

Sprue 106 is characterized by a sprue-fracture point at which it will break in response to a force imparted on gage 102. In similar fashion, body 108 is characterized by a body-fracture point at which it will break in response to a force imparted on gage 102. The sprue-fracture point is based, in part, on the fracture strain of material M1 and the dimensions of sprue 106, while the body-fracture point is based, in part, on the fracture strain of material M1 and the dimensions of body 108.

To mitigate damage due to passive force, it is desirable that material M1 be mechanically robust. Unfortunately, as a result, the fracture point of sprue 106 can be high enough that the force required to break it can give rise to significant damage to body 108 and/or wire bonds 206 of its respective strain gage. For the purposes of this Specification, including the appended claims, the term "damage threshold" is defined as the force imparted on a strain gage (or gage strip) that meets or exceeds the body-fracture point of its body 108 and/or causes damage to its wire bonds (if present).

It is another aspect of the present disclosure that the labor-intensive nature of conventional strain-gage production is mitigated and device yield can be improved by sprues that are designed to have a sprue-fracture point that is greater than the passive-force threshold but lower than the damage threshold of gage 102. Such sprues are able to survive the stresses associated with fabrication, shipping, handling, etc., but can be proactively broken via application of a force (or by a particular manipulation action) when desired (e.g., by a robotic handling tool, hand-held tweezers, etc.) without causing damage to their respective strain gages or gage strips. In other words, in some embodiments, sprues 106 are configured to mitigate accidental separation of the gages from their frames while simultaneously easing removal of the gages from the frame by applying a specific force or rotation via a handling tool. Furthermore, in some embodiments, the sprues are designed to substantially minimize the amount of material left attached to a gage after the sprue has been broken.

In some embodiments, at least one sprue includes a stress-concentration feature configured to fracture in response to the application of a force that is greater than the passive force but less than the damage threshold. Such stress-concentration points can:

i. define the locations at which a sprue will break; or
ii. reduce to magnitude of applied force necessary to break the sprue; or
iii. establish a minimum level of force required to break the sprue; or
iv. any combination of i, ii, and iii.

A sprue having a stress-concentration point facilitates, among other things, controlled wafer-level processing of strain gages, fast collection of strain gages from the wafer due to their highly ordered position on the substrate, tracking of strain gages and their performance characteristics to facilitate binning and quality control, high yield during fabrication and shipping of strain gages, and the like.

Figure 5:
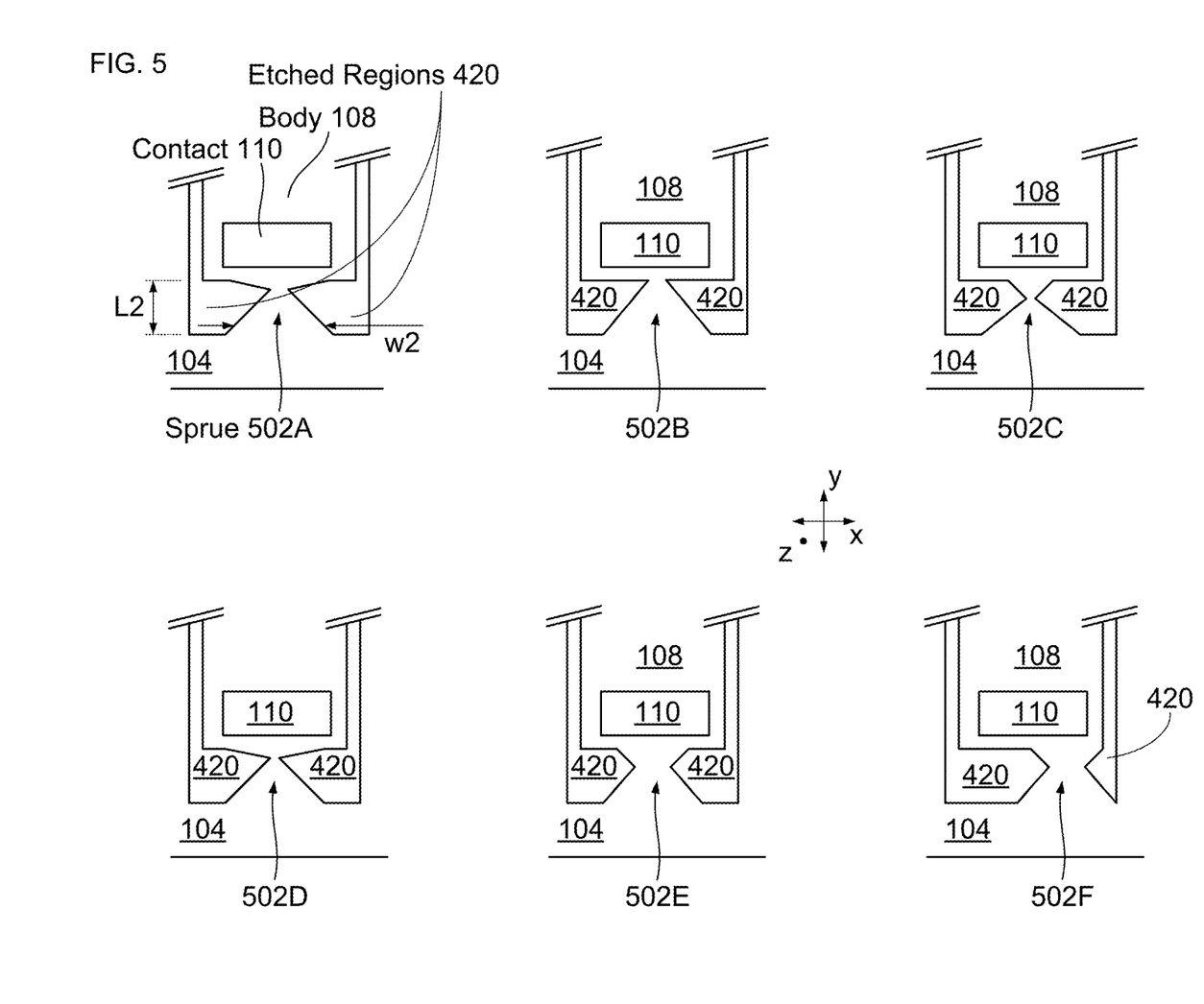
FIG. 5 depicts schematic drawings of plan views of some non-limiting examples of sprue designs in accordance with the present disclosure.

FIG. 5 depicts schematic drawings of plan views of some non-limiting examples of sprue designs in accordance with the present disclosure.

Each of sprues 502A through 502F is connected between body 108 and frame 104 and has length L2 along the y direction and width w2 along the x-direction.

Sprue 502A is a 10-micron wide tab that is centered at each end of body 108. Sprue 502A is configured such that the end of body 108 forms a wide angle at the sprue.

Sprue 502B is a 10-micron wide tab that is centered at each end of body 108. Sprue 502B is configured such that the end of body 108 is flat.

Sprue 502C is a 5-micron wide tab that is centered at each end of body 108. Sprue 502C is configured such that the end of body 108 forms a narrow angle at the sprue.

Sprue 502D is a 5-micron wide tab that is centered at each end of body 108. Sprue 502D is configured such that the end of body 108 forms a wide angle at the sprue.

Sprue 502E is a 20-micron wide tab that is centered at each end of body 108. Sprue 502E is configured such that the end of body 108 forms a narrow angle at the sprue.

Sprue 502F is a 20-micron wide tab that is positioned near a corner of each end of body 108. Sprue 502F is configured such that the end of body 108 forms a narrow angle at the sprue.

Although each of exemplary sprues 502A-502F is located at each end of its respective body 108, any sprue in accordance with the present disclosure can be located at only one end of the body of a strain gage.

The different designs for sprue 502 are configured to enable removal of gage 102 from frame 502 in response to different forces, different bending moments, and/or leave different amounts of structural material attached to gage 102 after it has been removed. In some embodiments, a sprue is explicitly designed to be broken by a particular handling tool, such as a robotic tool, a pick-and-place tool, hand-held tweezers, and the like and/or a particular motion by a handling tool (e.g., rotation, flexure, etc.).

It should be noted that even state-of-the-art SOI substrates typically have some slight variation of an electrical or physical parameter (e.g., sheet resistance, resistivity, thickness, etc.) over the lateral extent of their device layers. Such variation can lead to an undesirable variation in strain-gage device characteristics that can limit their utility in some applications.

It is yet another aspect of the present disclosure, however, that the uniformity of strain-gage device characteristics across an array of gages formed on an SOI substrate can be further improved by forming the gages such that their shapes are based on the value of a device-layer parameter at their respective positions within the array.

Figure 6:
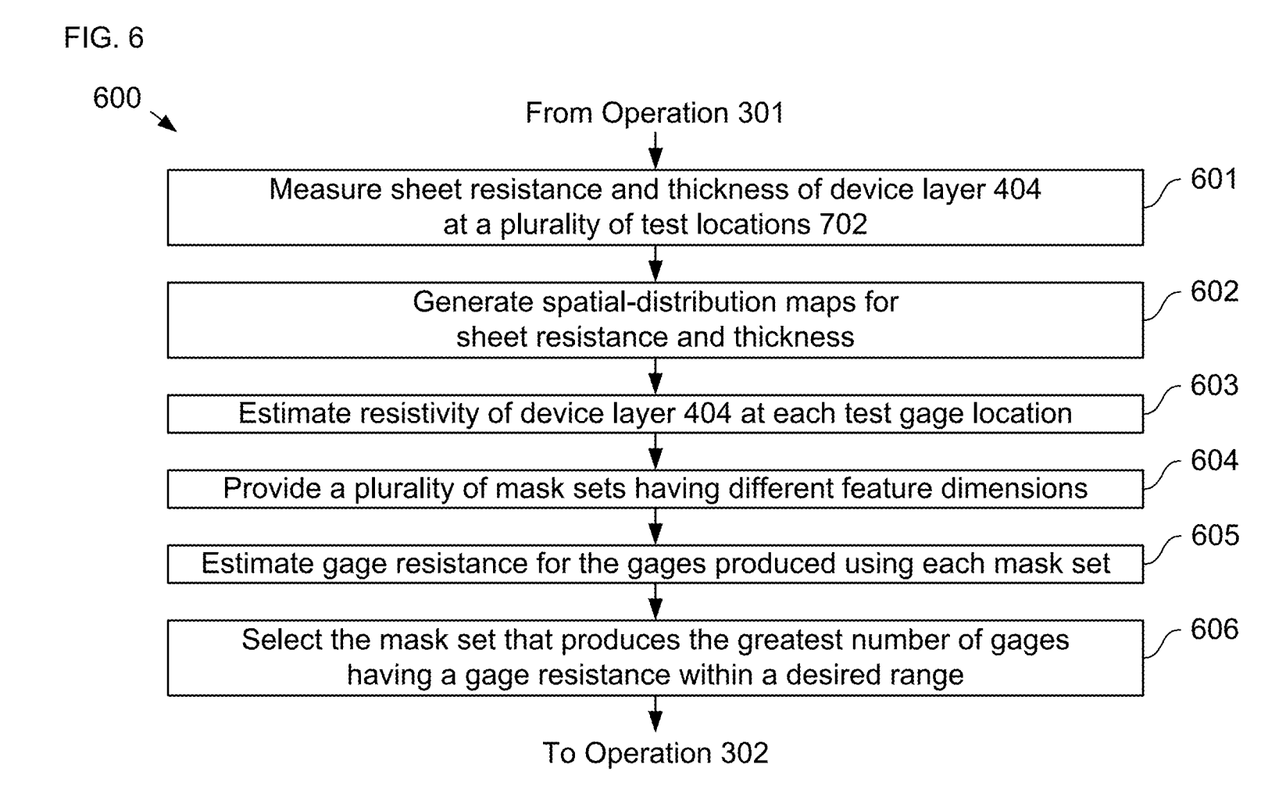
FIG. 6 depicts sub-operations of an optional operation suitable for improving the uniformity of strain-gage device characteristics across a substrate in accordance with the present disclosure.

FIG. 6 depicts sub-operations of an optional operation suitable for improving the uniformity of strain-gage device characteristics across a substrate in accordance with the present disclosure. In the depicted example, optional operation 600 is typically performed between operations 301 and 302 of method 300 described above; however, one skilled in the art will recognize, after reading this disclosure, that operation 600 can be used in any method suitable for forming an array of strain gages on an SOI substrate at any point between provisioning of the substrate and sculpting bodies 108.

Operation 600 begins with sub-operation 601, wherein a parameter of device layer 404 is measured at a plurality of points on substrate 402. In the depicted example, two parameters are measured, sheet resistance and layer thickness. In some embodiments, at least one measured parameter is a different electrical or physical property of device layer 404, such as resistivity, and the like. In some embodiments, only one parameter is measured (e.g., sheet resistance, resistivity, or layer thickness, etc.).

Figure 7A:
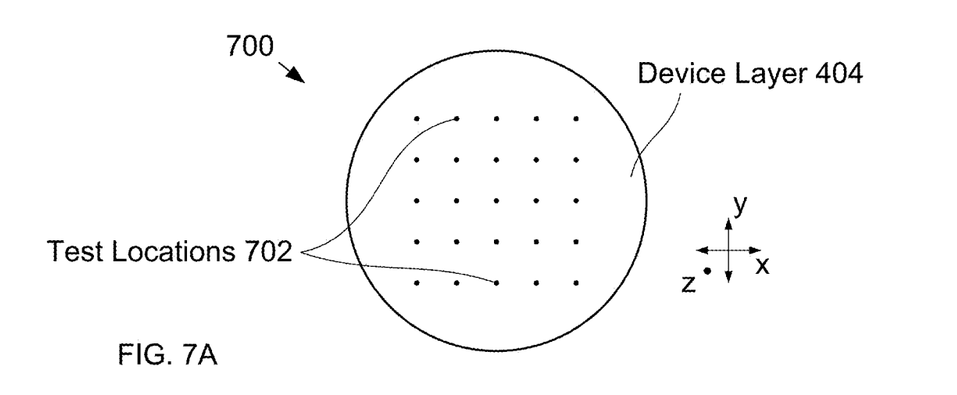
FIG. 7A depicts a schematic drawing of a plan view of a distribution of test-locations on a substrate in accordance with the present disclosure.

FIG. 7A depicts a schematic drawing of a plan view of a distribution of test-locations on a substrate in accordance with the present disclosure.

In the depicted example, distribution 700 includes a 5×5 array of test locations 702 at which both sheet resistance and layer thickness for device layer 404 is determined. As will be apparent to one skilled in the art, after reading this disclosure, any practical number and/or arrangement of test sites can be used without departing from the scope of this disclosure. For example, in some embodiments, hundreds of test sites are distributed over the surface of a substrate.

At sub-operation 602, maps of the spatial distribution of sheet resistance and layer thickness over at least a portion of device layer 404 is developed.

Figure 7B:
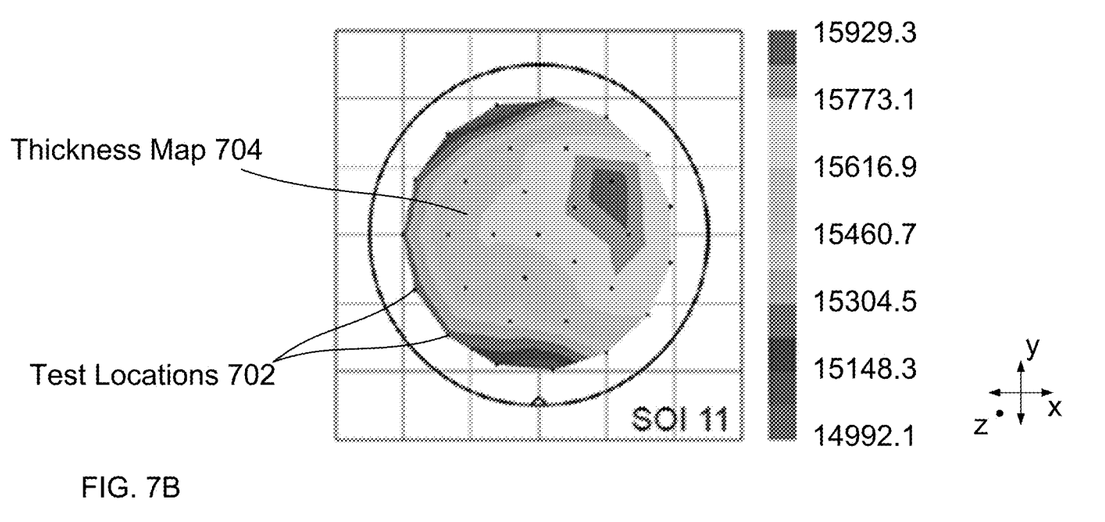
FIG. 7B depicts a schematic drawing of a plan view of a map of device-layer thickness over the lateral extent of substrate 302.

FIG. 7B depicts a schematic drawing of a plan view of a map of device-layer thickness over the lateral extent of substrate 402. Map 704 is generated by interpolation and/or extrapolation based on device-layer thicknesses determined at test locations 702.

At sub-operation 603, the resistivity of device layer 404 is estimated at each test gage location within the gage array based on the maps of the spatial distribution of sheet resistance and layer thickness.

At sub-operation 604, a plurality of mask sets is provided, where each mask set in the plurality includes at least one mask layer whose features (e.g., planform dimensions) at each gage location with the gage array are configured and/or sized based on the predicted gage resistance at that gage location. For each mask set, the predicted gage resistances are based on a different spatial distribution of the parameter(s) of interest (both sheet resistance and layer thickness in the depicted example) for device layer 404.

It should be noted that each mask set includes gage-strip numbers that enable each gage-strip formed on substrate 402 to be uniquely identified and tracked.

At sub-operation 605, for each mask set the gage resistance for each strain gage in the gage array is calculated based on the mask dimensions and resistivity of device layer 404 corresponding to that gage location.

At sub-operation 606, the mask set that is expected to yield the greatest number of gages having a gage resistance within a predetermined range is selected for use in the remainder of method 300. In some embodiments, the mask set that provides the highest gage yield is selected to fabricate the array of strain gages on a given substrate.

Figure 8:
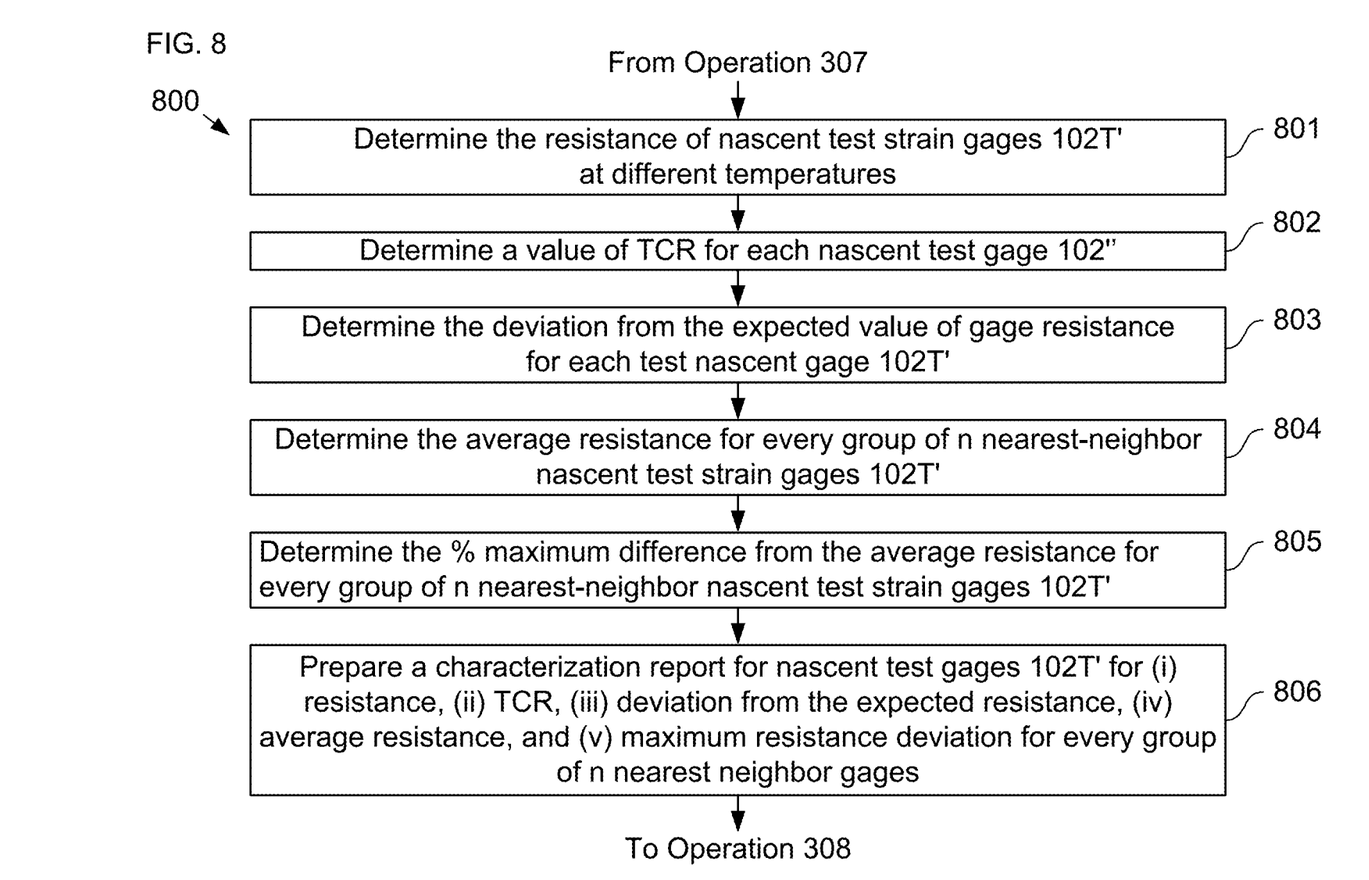
FIG. 8 depicts sub-operations of a sub-method suitable for identifying and tracking gages having substantially the same gage resistances at the wafer level in accordance with the present disclosure.

FIG. 8 depicts sub-operations of an exemplary optional sub-method suitable for identifying and tracking gages at the wafer level in accordance with the present disclosure. In the depicted example, optional sub-method 800 is inserted into method 300 after operation 307; however, one skilled in the art will recognize, after reading this disclosure, that sub-method 800 can be used at a number of points in any method suitable for collecting characterization data on the strain gages on an SOI substrate at any point after bodies 108 have been defined.

Sub-method 800 begins with sub-operation 801, wherein the gage resistance of each of a plurality of nascent test gages 102T' is determined at a plurality of temperatures.

In the depicted example, nascent test gages 102T' are the nascent gages 102' located at test locations 702, as discussed above and with reference to FIG. 7, and a conventional probe card is used to measure the gage resistances of nascent test gages 102T' at temperatures of 25° C. and 90° C. As will be apparent to one skilled in the art, after reading this disclosure, the gage resistances of the nascent test gages can be measured any practical temperature and using any suitable wafer-scale measurement technique without departing from the scope of the present disclosure.

At sub-operation 802, a value for the temperature coefficient of resistance (TCR) is determined for each nascent test gage 102T'.

At sub-operation 803, the deviation between an expected gage resistance and the measured gage resistance at a predetermined temperature is determined for each nascent test gage 102T'. The expected gage resistance of each nascent test gage is based on its configuration (e.g., shape of body 108 and distance, d1, between its contacts 110, etc.) and the resistivity determined of device layer 404 at its respective test location 702. In the depicted example, the pre-determined temperature is 25° C.

At sub-operation 804, at the predetermined temperature, an average gage resistance of every group of n nearest-neighbor nascent test gages 102T'. If desired, the resistances of one or more nascent gages 102' between adjacent nascent test gages can be estimated by interpolation. In some embodiments, the n-nearest neighbor nascent test gages are included in the same nascent gage strip 100'. In some embodiments, at least one group of n nearest-neighbor nascent test gages extends across multiple gage strips.

At sub-operation 805, for every group of n nearest-neighbor nascent gages 102', a % maximum resistance difference from the average gage resistance is determined for each nascent test gage 102T' in the group of n nearest-neighbor nascent test gages.

At sub-operation 806, a report is generated for at least one of (i) gage resistance, (ii) TCR, (iii) deviation of the measured gage resistance from expected gage resistance, and (iv) average gage resistance and (v) maximum resistance deviation for the nascent test gages, grouped by a combination of gage-strip number and n nearest-neighbor gages based on the distribution of test locations 702 and/or the geometry of gage 102.

It is to be understood that the disclosure teaches just some examples of embodiments in accordance with the present invention and that many variations of the invention can easily be devised by those skilled in the art after reading this disclosure and that the scope of the present invention is to be determined by the following claims.

What is claimed is:

1. A semiconductor strain gage comprising:
    at least one strain gage, each strain gage of the at least one strain gage having a body, where in the body includes a first width, a first thickness, a first length, and a longitudinal axis along a first direction, the body further comprising a first portion of a device layer of a semiconductor-on-insulator substrate, and wherein the device layer comprises a first semiconductor having a first resistivity;
    a first contact and a second contact each including a doped region of the device layer and a bond pad disposed on and electrically connected with the doped region, wherein the doped region comprises the first semiconductor and a first dopant and wherein the doped region has a second resistivity that is lower than the first resistivity, and wherein the first and second contacts are separated by a first distance along the longitudinal axis; and
    a frame that includes a second portion of the device layer;
    wherein the at least one strain gage is coupled to the frame by at least one sprue that extends between the frame and the body of the at least one strain gage;
    wherein the at least one strain gage has a damage threshold, and wherein each of the at least one sprue includes a stress-concentration feature, the stress-concentration feature being configured to break in response to a first force that is less than the damage threshold; and
    wherein the at least one strain gage has a gage resistance, and wherein the gage resistance is based on the first resistivity, the first thickness, the first width, and the first distance along the longitudinal axis of the body.

2. The semiconductor strain gage of claim 1 wherein the at least one strain gage further includes a plurality of strain gages that includes the at least one strain gage, and wherein the at least one sprue comprises a plurality of sprues, wherein each strain gage of the plurality of strain gages is attached to the frame by at least one sprue of the plurality of sprues, and wherein the frame, plurality of sprues, and plurality of strain gages collectively define a gage strip.

3. The semiconductor strain gage of claim 2 wherein each strain gage of the plurality of strain gages is substantially identical to one another, and wherein each sprue of the plurality of sprues is substantially identical to one another.

4. The semiconductor strain gage of claim 2 wherein the gage strip is characterized by a passive-force threshold, and wherein the stress-concentration feature is further configured to break only when the first force exceeds the passive-force threshold.

5. The semiconductor strain gage of claim 1 wherein the stress-concentration feature defines a location at which the at least one sprue breaks in response to the application of the first force.

6. The semiconductor strain gage of claim 1 wherein the body has a first end and a second end that is distal to the first end, and wherein the at least one sprue includes a first sprue that is connected between the first end and the frame and a second sprue that is connected between the second end and the frame.

7. The semiconductor strain gage of claim 1 wherein the at least one sprue has a second length along the first direction and a second width that is aligned with a second direction that is orthogonal with the first direction, and wherein the second width is non-uniform.

8. The semiconductor strain gage of claim 7 wherein the at least one sprue is aligned with the longitudinal axis.

9. The semiconductor strain gage of claim 1 wherein the first semiconductor is single-crystal silicon.

10. A first plurality of strain gages, each strain gage of the first plurality of strain gages comprising:
    a body that includes a first width, a first thickness, a first length, and a longitudinal axis along a first direction, wherein the body further comprises a first portion of a device layer of a semiconductor-on-insulator substrate, and wherein the device layer has the first thickness and comprises a first semiconductor having a first resistivity;
    a first contact and a second contact each including a doped region of the device layer and a bond pad disposed on and electrically connected with the doped region, wherein the doped region comprises the first semiconductor and a first dopant and has a second resistivity that is lower than the first resistivity, and wherein the first and second contacts are separated by a first distance along the longitudinal axis;
    a frame that includes a second portion of the device layer; and
    a plurality of sprues that physically couple the first plurality of strain gages to the frame such that the frame, the first plurality of strain gages, and the plurality of sprues collectively define a gage strip;
    wherein each strain gage of the first plurality of strain gages has a gage resistance that is based on the first resistivity, the first thickness, the first width, and the first distance along the longitudinal axis of the body;
    wherein each strain gage of the first plurality of strain gages has a damage threshold; and
    wherein each of the at least one sprue includes a stress-concentration feature that is configured to break in response to a first force that is less than the damage threshold.

11. The first plurality of strain gages of claim 10 wherein the first plurality of strain gages includes a second plurality of strain gages, each strain gage of the second plurality of strain gages being located at a different test location of a plurality of test locations.

12. The first plurality of strain gages of claim 10 wherein the gage strip has a passive-force threshold, and wherein the stress-concentration feature is further configured to break only when the first force exceeds the passive-force threshold.

13. The first plurality of strain gages of claim 10 wherein at least one sprue of the plurality of sprues has a second length along the first direction and a second width that is aligned with a second direction that is orthogonal with the first direction, and wherein the second width is non-uniform.

14. The first plurality of strain gages of claim 13 wherein the at least one sprue is aligned with the longitudinal axis.

15. The first plurality of strain gages of claim 10 wherein the first semiconductor is single-crystal silicon.

16. A first plurality of strain gages, each strain gage of the first plurality of strain gages comprising:
- a body having a first width, a first thickness, and a first length, the body being characterized by a longitudinal axis along a first direction, wherein the body comprises a first portion of a device layer of a semiconductor-on-insulator substrate, and wherein the device layer has the first thickness and comprises a first semiconductor having a first resistivity;
- first and second contacts, each of the first and second contacts including a doped region of the device layer and a bond pad disposed on and electrically connected with the doped region, wherein the doped region comprises the first semiconductor and a first dopant and has a second resistivity that is lower than the first resistivity, and wherein the first and second contacts are separated by a first distance along the longitudinal axis;
- a frame that includes a second portion of the device layer; and
- a plurality of sprues that physically couple the first plurality of strain gages to the frame such that the frame, the first plurality of strain gages, and the plurality of sprues collectively define a gage strip that is characterized by a passive-force threshold;

wherein each strain gage of the first plurality of strain gages has a gage resistance that is based on the first resistivity, the first thickness, the first width, and the first distance along the longitudinal axis of the body;

wherein each strain gage of the first plurality of strain gages is characterized by a damage threshold; and wherein each of the at least one sprue includes a stress-concentration feature that is configured to break in response to a first force that is less than the damage threshold and only when the first force exceeds the passive-force threshold.

17. The first plurality of strain gages of claim 16 wherein the first plurality of strain gages includes a second plurality of strain gages, each strain gage of the second plurality of strain gages being located at a different test location of a plurality of test locations.

18. The first plurality of strain gages of claim 16 wherein at least one sprue of the plurality of sprues has a second length along the first direction and a second width that is aligned with a second direction that is orthogonal with the first direction, and wherein the second width is non-uniform.

19. The first plurality of strain gages of claim 18 wherein the at least one sprue is aligned with the longitudinal axis.

20. The first plurality of strain gages of claim 16 wherein the first semiconductor is single-crystal silicon.

* * * * *